(12) United States Patent
Zhang et al.

(10) Patent No.: US 11,092,869 B2
(45) Date of Patent: Aug. 17, 2021

(54) DISPLAY PANEL, AND METHODS FOR MANUFACTURING AND CONTROLLING THE SAME

(71) Applicants: BEIJING BOE DISPLAY TECHNOLOGY CO., LTD., Beijing (CN); BOE TECHNOLOGY GROUP CO., LTD., Beijing (CN)

(72) Inventors: Hongshu Zhang, Beijing (CN); Xiaoling Xu, Beijing (CN); Yun Qiu, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 109 days.

(21) Appl. No.: 16/140,432

(22) Filed: Sep. 24, 2018

(65) Prior Publication Data

US 2019/0094644 A1 Mar. 28, 2019

(30) Foreign Application Priority Data

Sep. 25, 2017 (CN) .......................... 201710880636.3

(51) Int. Cl.
*G02B 26/00* (2006.01)
*G02F 1/167* (2019.01)
(Continued)

(52) U.S. Cl.
CPC ............ *G02F 1/167* (2013.01); *G02F 1/0107* (2013.01); *G02F 1/0121* (2013.01);
(Continued)

(58) Field of Classification Search
CPC .... G02F 1/167; G02F 1/16755; G02F 1/1676; G02F 1/23; G02F 2201/56; G02F 1/21;
(Continued)

(56) References Cited

U.S. PATENT DOCUMENTS 9,470,949 B2 * 10/2016 Chen ................... G02F 1/167
2004/0136047 A1    7/2004 Whitehead et al.
(Continued)

FOREIGN PATENT DOCUMENTS

CN        1820223 A      8/2006
CN      101160547 A      4/2008
(Continued)

OTHER PUBLICATIONS

First Office Action issued in corresponding Chinese Application 201710880636.3, dated Apr. 17, 2020, with English language translation.

*Primary Examiner* — Mahidere S Sahle
(74) *Attorney, Agent, or Firm* — McDermott Will and Emery LLP

(57) ABSTRACT

A display panel includes: a substrate; a plurality of first grooves formed in a surface of the substrate; a second metal layer, a dielectric layer and a first metal electrode layer disposed in sequence within each of the plurality of first grooves; electronic ink filled within each of the plurality of first grooves; a first encapsulation substrate disposed on the surface of the substrate provided with the plurality of first grooves; and a plurality of point electrodes disposed on the first encapsulation substrate. The first metal electrode layer is semi-transmissive, the dielectric layer is light-transmissive, and the second metal layer is non-transmissive. The electronic ink includes black charged particles. The plurality of first grooves are in one-to-one correspondence with the plurality of point electrodes.

14 Claims, 8 Drawing Sheets

(51) Int. Cl.
  *G02F 1/01*      (2006.01)
  *G02F 1/21*      (2006.01)
  *G02F 1/16755*   (2019.01)
  *G02F 1/23*      (2006.01)
  G02F 1/1676      (2019.01)

(52) U.S. Cl.
  CPC ............ *G02F 1/16755* (2019.01); *G02F 1/21* (2013.01); *G02F 1/23* (2013.01); *G02F 1/1676* (2019.01); *G02F 2201/56* (2013.01); *G02F 2203/15* (2013.01)

(58) Field of Classification Search
  CPC ... G02F 1/0121; G02F 1/0107; G02F 2203/15
  USPC .................................................. 359/290, 296
  See application file for complete search history.

(56) References Cited

U.S. PATENT DOCUMENTS

2005/0057715 A1* 3/2005 Hashimoto ....... G02F 1/133734
                                                      349/125
2010/0117951 A1   5/2010 Kim et al.

FOREIGN PATENT DOCUMENTS

| CN | 101533159 A     |   | 9/2009 |
| CN | 102681280 A     |   | 9/2012 |
| CN | 205080346 U     |   | 3/2016 |
| KR | 2002-0041053 A  |   | 6/2002 |
| KR | 20020041053 A   | * | 6/2002 |
| WO | 2016073537 A1   |   | 5/2016 |

* cited by examiner

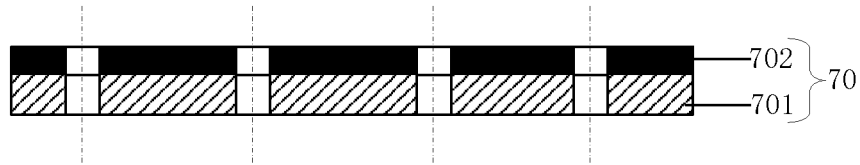

Fig. 10b

| A film layer having a plurality of second grooves is formed on a lower substrate on which a plurality of third electrodes have been formed. The second grooves are formed via a nanoimprint technology. Each of the plurality of second grooves includes a first sub-groove and a second sub-groove. The first sub-groove is a hemispherical groove and has a bottom opening at its bottom. The second sub-groove is located at the bottom opening of the first sub-groove, and the bottom opening of the first sub-groove is communicated with a top opening of the second sub-groove located at its top. The second grooves are in one-to-one correspondence with the third electrodes | ⟵ S20 |

↓

| A perforated reflective layer is fixed at a bottom opening of a corresponding first sub-groove | ⟵ S21 |

↓

| Electronic ink is filled in each of the second grooves. The electronic ink includes black charged particles. A refractive index of liquid in the electronic ink is larger than a refractive index of the film layer having the plurality of second grooves, and a diameter of each of the charged particles is less than a diameter of each of via holes in the reflective layer | ⟵ S22 |

↓

| A plurality of fourth electrodes are formed on a second encapsulation substrate | ⟵ S23 |

↓

| The electronic ink in each of the plurality of second grooves is encapsulated by the second encapsulation substrate. The fourth electrodes are in one-to-one correspondence with the second grooves | ⟵ S24 |

Fig. 11

DISPLAY PANEL, AND METHODS FOR MANUFACTURING AND CONTROLLING THE SAME

CROSS-REFERENCE TO RELATED APPLICATION

This application claims priority to Chinese Patent Application No. 201710880636.3, filed on Sep. 25, 2017, titled "DISPLAY PANEL, AND METHODS FOR MANUFACTURING AND CONTROLLING THE SAME", which is incorporated herein by reference in its entirety.

TECHNICAL FIELD

The present disclosure relates to the field of display technologies, and more particularly to a display panel, and methods for manufacturing and controlling the same.

BACKGROUND

Display panels of the reflection-type products have the advantages of low cost and high reflectivity, and the reflection-type display panel has become a research hotspot in the display field.

SUMMARY

In a first aspect, a display panel is provided, and the display panel includes a substrate; a plurality of first grooves formed in a surface of the substrate; a second metal layer, a dielectric layer and a first metal electrode layer disposed in sequence within each of the plurality of first grooves, wherein the first metal electrode layer is semi-transmissive, the dielectric layer is light-transmissive, and the second metal layer is non-transmissive; electronic ink filled within each of the plurality of first grooves, wherein the electronic ink includes black charged particles; a first encapsulation substrate disposed on the surface of the substrate provided with the plurality of first grooves; and a plurality of point electrodes disposed on the first encapsulation substrate, wherein the plurality of first grooves are in one-to-one correspondence with the plurality of point electrodes.

In some embodiments, the plurality of first grooves are arcuate first grooves.

In some embodiments, the first metal electrode layer, the dielectric layer and the second metal layer form a Fabry-Perot cavity, and the Fabry-Perot cavity is configured to filter incident light.

In some embodiments, the second metal layer is a second metal electrode layer.

In some embodiments, the display panel has a plurality of pixel regions, and each pixel region includes at least three sub-pixels. Each sub-pixel region has a corresponding first groove therein, and thicknesses of the dielectric layers of different sub-pixel regions in each of the plurality of pixel region are different.

In some embodiments, each of the plurality of pixel regions includes a first sub-pixel region, a second sub-pixel region and a third sub-pixel region. A thickness of a dielectric layer in the first sub-pixel region is a first thickness, and the dielectric layer having the first thickness is configured to filter out light other than red light. A thickness of a dielectric layer in the second sub-pixel region is a second thickness, and the dielectric layer having the second thickness is configured to filter out light other than green light. A thickness of a dielectric layer in the third sub-pixel region is a third thickness, and the dielectric layer having the third thickness is configured to filter out light other than blue light.

In some embodiments, the first thickness is less than the third thickness, and the third thickness is less than the second thickness.

In some embodiments, a Fabry-Perot cavity in each sub-pixel region includes two Fabry-Perot sub-cavities that are insulated from each other, and there is no overlap between orthographic projections of the two Fabry-Perot sub-cavities on the first encapsulation substrate.

In some embodiments, the plurality of first grooves are hemispherical first grooves.

In some embodiments, each of the plurality of point electrodes is located at a center of sphere of a corresponding first groove.

In some embodiments, a thickness of the first metal electrode layer ranges from 15 nm to 50 nm, and a thickness of the second metal layer ranges from 100 nm to 1500 nm.

In some embodiments, a material of the substrate includes a resin.

In a second aspect, a method for manufacturing the display panel described in the above aspect is provided, and the method includes: forming, via a nanoimprint process, a plurality of first grooves in a surface of a substrate; forming a second metal layer, a dielectric layer and a first metal electrode layer in sequence within each of the plurality of first grooves, wherein the first metal electrode layer, the dielectric layer and the second metal layer form a Fabry-Perot cavity, the first metal electrode layer is semi-transmissive, the dielectric layer is light-transmissive, and the second metal layer is non-transmissive; filling electronic ink in each of the plurality of first grooves, wherein the electronic ink comprises black charged particles; forming a plurality of point electrodes on a first encapsulation substrate; and encapsulating, by the first encapsulation substrate, the electronic ink in each of the plurality of first grooves, wherein the plurality of first grooves are in one-to-one correspondence with the plurality of point electrodes.

In a third aspect, a method for controlling the display panel described in the above aspect is provided, and the method includes: applying a voltage to a first metal electrode layer so that charged particles are adsorbed onto a surface of the first metal electrode layer when a region, where a corresponding first groove is located, is in an off-state; and applying a voltage to a point electrode to concentrate the charged particles toward the point electrode when a region, where a corresponding first groove is located, is in an on-state.

In a fourth aspect, a display panel is provided, and the display panel includes: a lower substrate; a plurality of third electrodes disposed on the lower substrate; a film layer disposed on the lower substrate; a plurality of second grooves formed in a surface of the film layer facing away from the lower substrate, wherein the plurality of second grooves are in one-to-one correspondence with the plurality of third electrodes; a perforated reflective layer fixed within each of the plurality of second grooves, wherein the perforated reflective layer is located near a bottom of a corresponding second groove, and there is a space between the perforated reflective layer and the bottom of the corresponding second groove; electronic ink filled in each of the plurality of second grooves, wherein the electronic ink comprises black charged particles, a refractive index of a liquid in the electronic ink is larger than a refractive index of the film layer, and a diameter of each of the charged particles is smaller than a diameter of each of via holes in the perforated reflective layer; a second encapsulation substrate disposed on the surface of the film layer provided with the plurality of second grooves; and a plurality of transparent fourth electrodes disposed on the second encapsulation substrate, wherein, the plurality of transparent fourth electrodes and the plurality of second grooves are in on-to-one correspondence.

In some embodiments, each of the plurality of second grooves includes a hemispherical groove portion.

In some embodiments, each of the plurality of second grooves comprises a first sub-groove and a second sub-groove, the first sub-groove is a hemispherical groove, and has a bottom opening at its bottom, the second sub-groove is located at the bottom opening of the first sub-groove, and the bottom opening of the first sub-groove is communicated with a top opening of the second sub-groove at its top. The perforated reflective layer is fixed at the bottom opening of the first sub-groove.

In some embodiments, the perforated reflective layer includes a perforated polymer film layer and a perforated metal reflective layer, which are stacked. Via holes in the perforated metal reflective layer are in one-to-one correspondence with via holes in the perforated polymer film layer, and the via holes in the perforated metal reflective layer and the via holes in the perforated polymer film layer completely overlap each other.

In a fifth aspect, a method for manufacturing a display panel is provided, and the method includes: forming a film layer having a plurality of second grooves on a lower substrate on which a plurality of third electrodes have been formed, wherein the plurality of second grooves are formed in a surface of the film layer facing away from the lower substrate via a nanoimprint technology, each of the plurality of second grooves comprises a hemispherical groove portion, and the plurality of second grooves are in one-to-one correspondence with the plurality of third electrodes; fixing a perforated reflective layer within each of the plurality of second grooves at a bottom of a corresponding second groove, wherein there is a space between the perforated reflective layer and the bottom of the corresponding second groove; filling electronic ink in each of the plurality of second grooves, wherein the electronic ink comprises black charged particles, a refractive index of a liquid in the electronic ink is larger than a refractive index of the film layer having the plurality of second grooves, and a diameter of each of the black charged particles is smaller than a diameter of each of via holes in the perforated reflective layer; forming a plurality of transparent fourth electrodes on a second encapsulation substrate; and encapsulating the electronic ink in each of the plurality of second grooves by the second encapsulation substrate, wherein the plurality of fourth electrodes are in one-to-one correspondence with the plurality of second grooves.

A sixth aspect, a method for controlling the display panel described in the fourth aspect is provided, and the method includes: applying a voltage to a fourth electrode so that charged particles are adsorbed on a side of a second encapsulation substrate close to a corresponding second groove when a region, where the second groove is located, is in an off-state; and applying a voltage to a third electrode to make the charged particles pass through via holes in a corresponding perforated reflective layer and enter a corresponding second sub-groove when a region, where a corresponding second groove is located, is in an on-state.

BRIEF DESCRIPTION OF THE DRAWINGS

In order to describe technical solutions in embodiments of the present disclosure more clearly, the accompanying drawings to be used in the description of embodiments will be introduced briefly. Obviously, the accompanying drawings to be described below are merely some embodiments of the present disclosure, and a person of ordinary skill in the art can obtain other drawings according to those drawings without paying any creative effort.

FIG. 7b is a schematic diagram of a structure obtained after a second metal layer, a dielectric layer and a first metal electrode layer are formed in sequence on the basis of FIG. 7a;

FIG. 10b is a sectional view of FIG. 10a;

FIG. 11 is schematic flowchart of a method for manufacturing another display panel according to some embodiments of the present disclosure;

FIG. 12b is a schematic diagram of a structure obtained after a reflective layer is formed on the basis of FIG. 12a.

DETAILED DESCRIPTION

Technical solutions in embodiments of the present disclosure will be described clearly and completely with reference to the accompanying drawings in the embodiments of the present disclosure. Obviously, the described embodiments are merely some but not all of embodiments of the present disclosure. All other embodiments made on the basis of the embodiments of the present disclosure by a person of ordinary skill in the art without paying any creative effort shall be included in the protection scope of the present disclosure.

Figure 1:
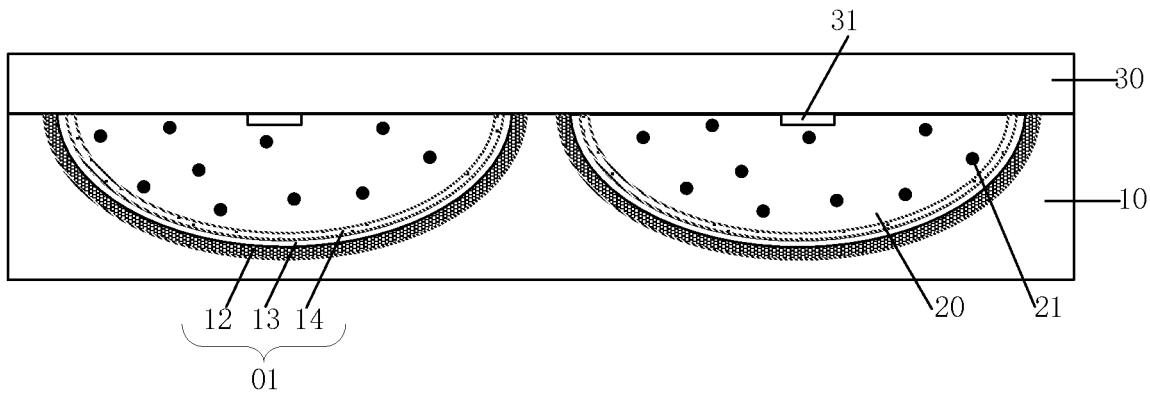
FIG. 1 is a first schematic diagram of a display panel according to some embodiments of the present disclosure.
Figure 2:
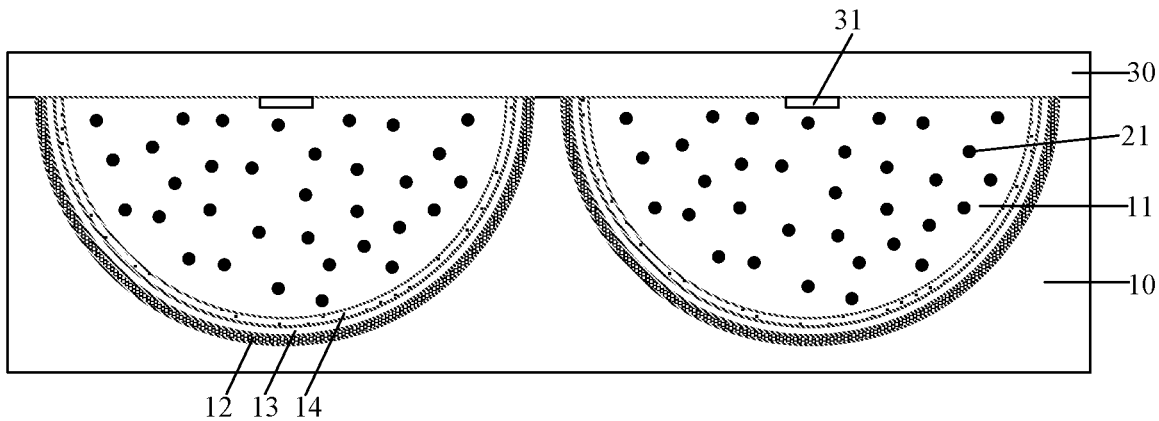
FIG. 2 is a second schematic diagram of a display panel according to some embodiments of the present disclosure.

Some embodiments of the present disclosure provide a display panel. As shown in FIGS. 1 and 2, the display panel includes a substrate 10, and a plurality of first grooves (shown in FIG. 7a) formed in a surface of the substrate 10.

Figure 7A:
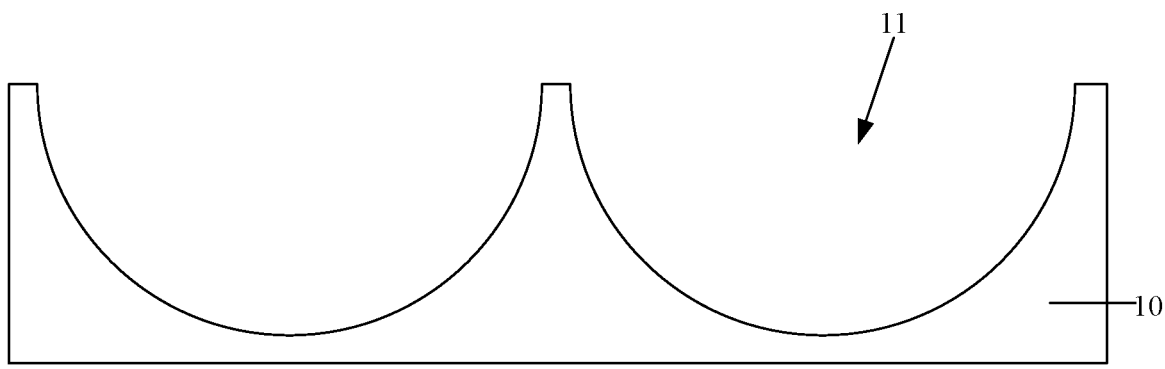
FIG. 7a is a schematic diagram of a structure obtained by forming a first groove on a substrate according to some embodiments of the present disclosure.
Figure 7B:
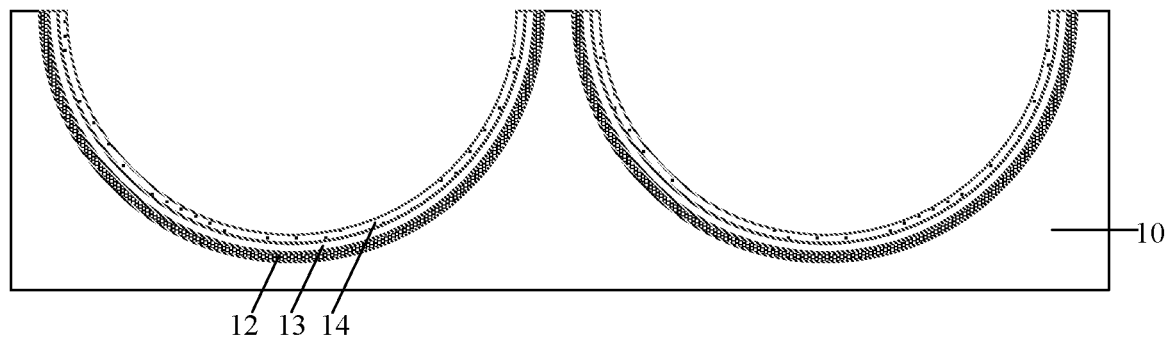

In some embodiments, as shown in FIG. 7a or 7b, each of the plurality of first grooves 11 is an arcuate first groove 11. The arcuate first groove includes for example a bottom surface and a side wall extending up from the bottom surface. At least a portion of the arcuate first groove 11 is a curved surface. For example, as shown in FIG. 7d, the bottom surface of the arcuate first groove 11 is a curved surface. Optionally, the side wall b of the arcuate first groove 11 is a curved surface. Optionally, both the bottom surface a and the side wall b of the arcuate first groove 11 are curved surfaces.

Based on this, in some embodiments, each of the first grooves 11 is a part of a sphere. For example, each of the first grooves 11 is a hemispherical groove shown in FIG. 2, so that a reflectivity is higher in an on-state, and an outdoor visibility is also enhanced. Under this circumstance, radians of a bottom surface a and a side wall b of the first groove 11 are the same.

Hereinafter, for convenience of description, the arcuate first groove 11 being a part of a sphere is taken as an example, and a bottom surface a and a side wall b of each of the plurality of first grooves 11 are referred to as a circular arc surface.

In addition, the display panel 10 further includes a second metal layer 12, a dielectric layer 13 and a first metal electrode layer 14 disposed within each of the first grooves 11 in sequence as shown in FIG. 1. The second metal layer 12, the dielectric layer 13 and the first metal electrode layer 14 cover the circular arc surface of the first groove 11 in sequence.

The first metal electrode layer 14 is semi-transmissive, the dielectric layer 13 is light-transmissive, and the second metal layer 12 is non-transmissive. Under this circumstance, after passing through the first metal electrode layer 14 and the dielectric layer 13, incident light is incident on the second metal layer 12, and then is reflected off the second metal layer 12. After the reflected light is received by human eyes, a display can be achieved.

In addition, the display panel further includes electronic ink 20 filled in each of the first grooves 11. The electronic ink 20 includes a liquid and black charged particles 21 suspended in the liquid, and the black charged particles 21 are scattered in the liquid. The black charged particles 21 are charged particles each of which is covered by black pigment.

The display panel further includes a first encapsulation substrate 30 disposed on the surface of the substrate 10 provided with the grooves, and a plurality of point electrodes 31 disposed on the first encapsulation substrate 30. The first encapsulation substrate 30 is configured to encapsulate the electronic ink 20 within each of the first grooves 11. The first grooves 11 are in one-to-one correspondence with the point electrodes 31.

It will be noted that, each of the point electrodes 31 is on the order of microns, and the specific size of each of the point electrodes 31 can be determined according to the size of a corresponding one of the first grooves 11. An area of each of the point electrodes 31 is much smaller than an opening area of a corresponding one of the first grooves 11, so that the light reflected off the second metal layer 12 is rarely or never blocked by the point electrode 31, and then enters the human eyes.

The shapes of the point electrodes 31 are not limited in the present disclosure, and may be a shape, such as a rectangle shape, that is easy to be manufactured in a process.

Each of the point electrodes 31 can be provided in a region where the reflected light is less, according to the specific shape of a corresponding one of the first grooves 11. In some embodiments, in a case where a first groove 11 is a portion of the sphere, for example in a case where the first groove 11 is a hemispherical groove, the point electrode 31 is disposed at a center of sphere of the first groove 11. Since in the case where the first groove 11 is a hemispherical groove, the reflectivity at the center of sphere of the first groove is lower, disposing the point electrode 31 at the center of sphere of the first groove may reduce the influence of the black charged particles 21 concentrated near the point electrode 31 on the emission of the reflected light in the on-state, so that more reflected light may enter the human eyes, and the power consumption is reduced.

Figure 3A:
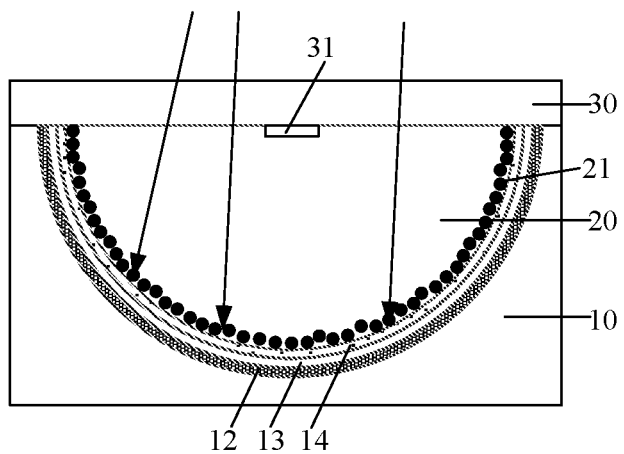
FIG. 3a is a schematic diagram showing a region of a display panel, where one of first grooves is located, in an off-state according to some embodiments of the present disclosure.

Based on the structure of the display panel, a reflection-type display may be realized. For example, as shown in FIG. 3a, for a region of the display panel where one of the first grooves 11 is located, when it is in an off-state, the black charged particles 21 are adsorbed on a surface of a corresponding first metal electrode layer 14 by applying a voltage to the first metal electrode layer 14. In this case, even if light is incident on the first groove 11, there is no reflected light, and thus a dark state is formed in this region. In order to supply power to the first metal electrode layer 14, the display panel further includes second power supply lines disposed on the first encapsulation substrate 30, and each second power supply line is configured to supply power to a corresponding first metal electrode layer 14.

In addition, since the first metal electrode layer 14 is disposed adjacent to the electronic ink 20, when the voltage is applied to the first metal electrode layer 14, the charged particles 20 can be adsorbed on the surface of the first metal electrode layer 14. Since a thickness of the dielectric layer 13 is relatively thin, in some embodiments, the second power supply line is provided such that the first metal electrode layer 14 and the second metal layer 12 are simultaneously supplied with power through the second power supply line. Under this circumstance, the second metal layer 12 is for example a second metal electrode layer. In this way, the point electrode 31 located within the first groove 11 only needs to be opposite to the first metal electrode layer 14 or the second metal layer within the first groove 11, thereby reducing the alignment requirement of the first encapsulation substrate 30 during encapsulating.

Figure 3B:
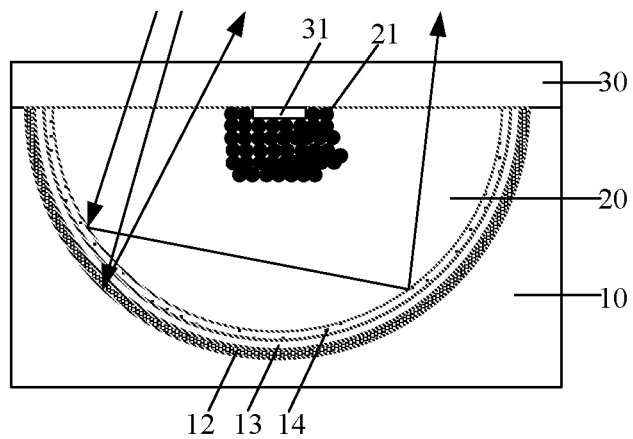
FIG. 3b is a schematic diagram showing a region of a display panel, where one of first grooves is located, in an on-state according to some embodiments of the present disclosure.

As shown in FIG. 3b, when in an on-state, the black charged particles 21 are concentrated onto the point electrode 31 by applying a voltage to the point electrodes 31. In this case, the light is incident on the first groove 11, and then is reflected off the surface of the first metal electrode layer 14. The light is reflected almost in the full-band, so that the human eyes can receive the reflected light so as to realize the screen display. In order to supply power to the point electrode 31, the display panel further includes first power supply lines disposed on the first encapsulation substrate 30, and each first power supply line is electrically connected with a corresponding point electrode 31. Different point electrodes 31 are separately supplied with power through the first power supply lines, that is, the point electrodes 31 are insulated from each other.

Based on this, in some embodiments, Fabry-Perot (F-P) cavities 01 are formed within the first grooves 11 respectively, to filter light by using a Fabry-Perot interference principle. For example, the first metal electrode layer 12, the dielectric layer 13 and the second metal layer 14 located within each first groove 11 form a F-P cavity 01. The F-P cavity 01 is used to filter the incident light which is then emitted from the F-P cavity 01, so that monochromatic light is emitted from the first groove 11. Under this circumstance, the light is incident on the first groove 11, a part of light is reflected off the surface of the first metal electrode layer 14, and a remaining part of light enters the F-P cavity 01 for being filtered, and then is emitted from the first encapsulation substrate 30 after being reflected off the second metal layer 12.

Based on this, a wavelength range of the light reflected from the F-P cavity 01 can be selected by controlling a thickness of the dielectric layer 13, so as to realize color display.

When the charged particles 21 are negatively charged, in the off-state and in the on-state, positive voltages can be applied to the first metal electrode layer 14 and the point electrode 31, respectively. Similarly, when the charged particles 21 are positively charged, in the off-state and in the on-state, negative voltages can be applied to the first metal electrode layer 14 and the point electrode 31, respectively.

With respect to the arrangement that one of the point electrodes 31 is disposed close to the electronic ink 20, if the point electrode 31 is disposed on a surface of the first encapsulation substrate 30 facing away from the electronic ink 20, a larger voltage is needed to concentrate the charged particles 21 toward the point electrode 31 in the on-state. Therefore, in some embodiments, the point electrodes 31 are disposed on a surface of the first encapsulation surface 30 adjacent to the electronic ink 20.

In the display panel provided by the embodiments of the present disclosure, by disposing the first metal electrode layer 14, the dielectric layer 13 and the second metal 12 within the first groove, and disposing the point electrode 31 corresponding to the first groove on the first encapsulation substrate 30, the on-state display and the off-state display in a region corresponding to the first groove may be realized by controlling the voltage applied to the first metal electrode layer 14 and the point electrode 31 within the first groove. In addition, when the first metal electrode layer 14, the dielectric layer 13 and the second metal layer 12 form the F-R cavity 01, by controlling the thickness of the dielectric layer 13 of the F-R cavity 01, the band of the light reflected off the F-R cavity 01 can be adjusted, thereby realizing color display when in the on-state.

In some embodiments, a thickness of the first metal electrode layer 14 ranges from about 15 nm to about 50 nm. For example, the thickness of the first metal electrode layer 14 is 15 nm, 20 nm, 30 nm, 40 nm, or 50 nm.

The thinner the first metal electrode layer 14 (for example, less than 15 nm), the more the light entering the F-R cavity 01, but the filtering performance of the F-R cavity 01 becomes worse. However, the thicker the first metal electrode layer 14 (for example, larger than 50 nm), the less the light entering the F-R cavity 01, although the filtering performance of the F-P 01 is better. Therefore, in some embodiments, the thickness of the first metal electrode layer 14 is 20 nm.

A material of the first metal electrode layer 14 includes for example at least one of Ag, Al, Pt, or the like.

In some embodiments, a thickness of the second metal layer ranges from about 100 nm to about 1500 nm. For example, the thickness of the second metal layer 12 is 100 nm, 150 nm, 300 nm, 500 nm, 700 nm, 1000 nm, or 1500 nm, etc.

When the thickness of the second metal layer 12 is less than 100 nm, there is a probability of light transmission, thereby causing light loss. When the thickness of the second metal layer 12 is larger than 1500 nm, the thickness of the second metal layer 12 is too large, thereby reducing the volume of the chamber of the first groove 11 for receiving the electronic ink 20.

In a case where the second metal layer 12 is non-transmissive, in consideration of the demand for the display panel with a thinner thickness, the thickness of the second metal layer 12 is for example 150 nm.

A material of the second metal layer 12 includes at least one of Ag, Al, Pt, or the like.

In some embodiments, the material of the first metal electrode layer 14 and the material of the second metal layer 12 are the same. In some other embodiments, the material of the first metal electrode layer 14 and the material of the second metal layer 12 are different.

In some embodiments, a material of the dielectric layer 13 is a transparent insulating medium such as $Al_2O_3$, silicon nitride, etc.

Since the first groove 11 is easily formed on a resin, in some embodiments, a material of the substrate 10 includes the resin. Exemplary, the material of the substrate 10 is one of the polydimethylsiloxane (PEMS), polyethylene glycol terephthalate (PET), polyimide (PI).

It will be noted that, when the material of the substrate 10 is the resin, the substrate 10 may be manufactured on a carrier substrate.

Figure 4:
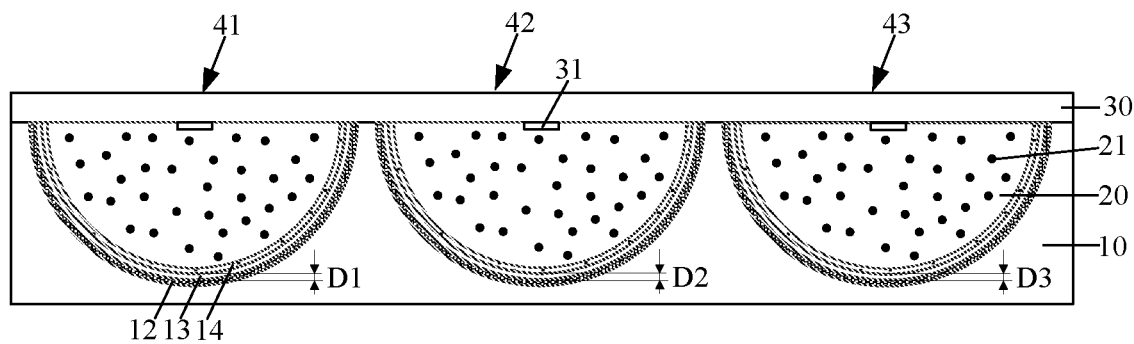
FIG. 4 is a third schematic diagram of a display panel according to some embodiments of the present disclosure.

Based on the aforementioned description, in some embodiments, the display panel has a plurality of pixel regions, and each pixel region includes at least three sub-pixel regions, such as, a first sub-pixel region 41, a second first sub-pixel region 42 and a third first sub-pixel region 43 shown in FIG. 4. Each sub-pixel region has a first groove 11 therein, and thicknesses of the dielectric layers 13 of different sub-pixel regions in a same pixel region are different. That is, a color display may be realized in the pixel region by controlling the thicknesses of the dielectric layers 13 in different sub-pixel regions of the pixel region, so that the display panel has a color display function.

In some embodiments, as shown in FIG. 4, each pixel region includes a first sub-pixel region 41, a second sub-pixel region 42 and a third sub-pixel region 43. A thickness of a dielectric layer 13 in the first sub-pixel region 41 is a first thickness D1, and the dielectric layer 13 having the first thickness D1 is configured to filter out light other than red light. A thickness of a dielectric layer 13 in the second sub-pixel region 42 is a second thickness D2, and the dielectric layer 13 having the second thickness D2 is configured to filter out light other than green light. A thickness of a dielectric layer 13 in the third sub-pixel region 43 is a third thickness D3, and the dielectric layer 13 having the third thickness D3 is configured to filter out light other than blue light.

That is, the first sub-pixel region 41 is configured to reflect red light so that the red light is emitted from the first encapsulation substrate 30, the second sub-pixel region 42 is configured to reflect green light so that the green light is emitted from the first encapsulation substrate 30, and the third sub-pixel region 43 is configured to reflect blue light so that the blue light is emitted from the first encapsulation substrate 30.

In some embodiments, the first thickness D1 is less than the third thickness D3, and the third thickness D3 is less than the second thickness D2. Exemplary, the first thickness is 48 nm, the second thickness is 93 nm, and the third thickness is 83 nm.

It will be noted that, a gray scale of monochromatic light emitted from each of the sub-pixel regions can be controlled by controlling the voltage applied to a corresponding point electrode 31.

Figure 5:
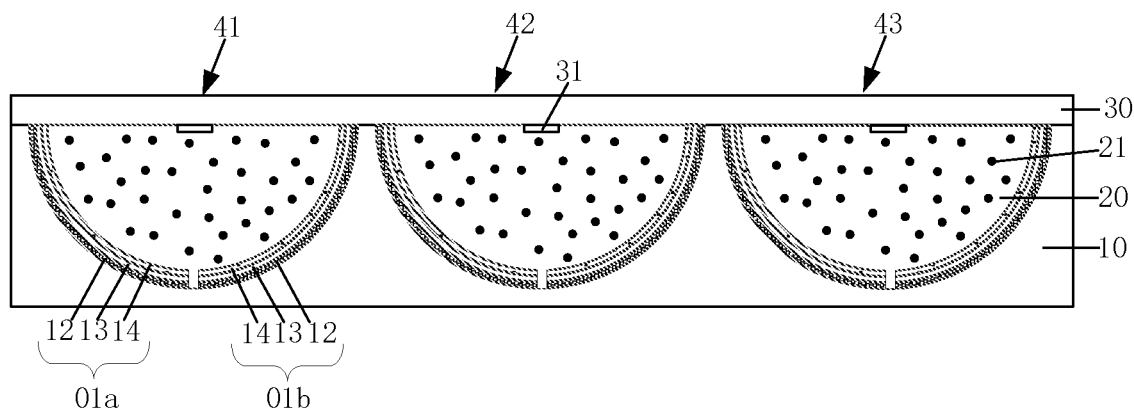
FIG. 5 is a fourth schematic diagram of a display panel according to some embodiments of the present disclosure.

In order to make the colors displayed by the display panel look richer, and make the picture more exquisite, in some embodiments, as shown in FIG. 5, the F-R cavity in each of the sub-pixel regions includes two F-R sub-cavities 01 insulated from each other (F-R sub-cavity 01a and F-R sub-cavity 01b), and orthographic projections of the two F-R sub-cavities on the first encapsulation substrate 30 do not overlap. Similarly, as shown in FIG. 5, each of the two F-R sub-cavities 01 includes a first metal electrode sub-layer 14, a dielectric sub-layer 13 and a second metal sub-layer 12. In this case, the gray scale of the monochromatic light emitted from each of the sub-pixel regions may be improved by independently supplying power to a first metal electrode sub-layer 14 of each of corresponding two sub-F-R cavities, or a first metal electrode sub-layer 14 and a second metal sub-layer 12 of each of corresponding two F-R sub-cavities.

In some embodiments, the thicknesses of the dielectric sub-layers 13 of the two F-R sub-cavities in the same sub-pixel region are the same.

It will be noted that, for two F-R sub-cavities in each of the sub-pixel regions, in order to insulate the two F-R sub-cavities from one another, an insulation region is provided between the two F-R sub-cavities (a gap between the two F-R sub-cavities shown in FIG. 5). In the insulation region, the first metal electrode sub-layers 14 are disconnected, and in a case where both the first metal electrode sub-layers 14 and the second metal sub-layers 12 are supplied power, the second metal sub-layers 12 are also disconnected. In some embodiments, the dielectric sub-layers 13 are disconnected, as shown in FIG. 5. Alternatively, the dielectric sub-layers 13 are connected.

Figure 6:
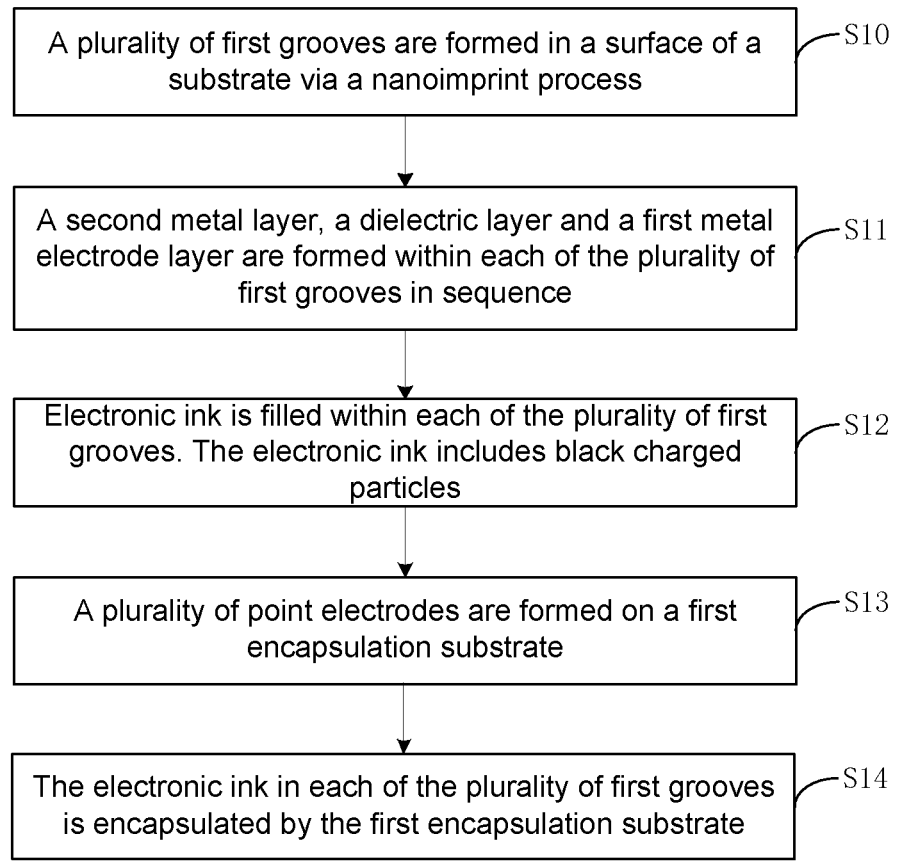
FIG. 6 is a flowchart of a method for manufacturing a display panel according to some embodiments of the present disclosure.

Some embodiments of the present disclosure provide a method for manufacturing a display panel, such as the display panel according to any one of the above embodiments. As shown in FIG. 6, the method includes S10-S14.

In S10, as shown in FIG. 7a, a plurality of first grooves 11 are formed in a surface of a substrate 10 via a nanoimprint process.

A material of the substrate 10 includes for example a resin. Exemplary, the material of the substrate 10 includes at least one of PEMS, PET, or PI.

It will be noted that, FIG. 7a is shown by taking each of the first grooves 11 being a hemispherical groove as an example, but the shape of each of the first grooves 11 is not limited thereto.

In S11, as shown in FIG. 7b, a second metal layer 12, a dielectric layer 13 and a first metal electrode layer 14 are formed within each of the plurality of first grooves 11 in sequence. The second metal layer 12, the dielectric layer 13 and the first metal electrode layer 14 form a F-R cavity 01. The first metal electrode layer 14 is semi-transmissive layer, the dielectric layer 13 is light-transmissive, and the second metal layer 12 is non-transmissive.

For example, a thickness of the first metal electrode layer 14 ranges from about 15 nm to about 50 nm, and a thickness of the second metal layer 12 ranges from about 100 nm to about 1500 nm.

In some embodiments, both a material of the first metal electrode layer 14 and a material of the second metal layer 12 include at least one of Ag, Al, Pt or the like, and the material of the first metal electrode layer 14 and the material of the second metal layer 12 are for example the same. A material of the dielectric layer 13 is for example an insulating medium such as $Al_2O_3$, silicon nitride, etc.

It will be noted that, the thickness of the dielectric layer 13 within each of the first grooves 11 can be selected according to a waveband that needs to be emitted after being reflected.

Figure 7C:
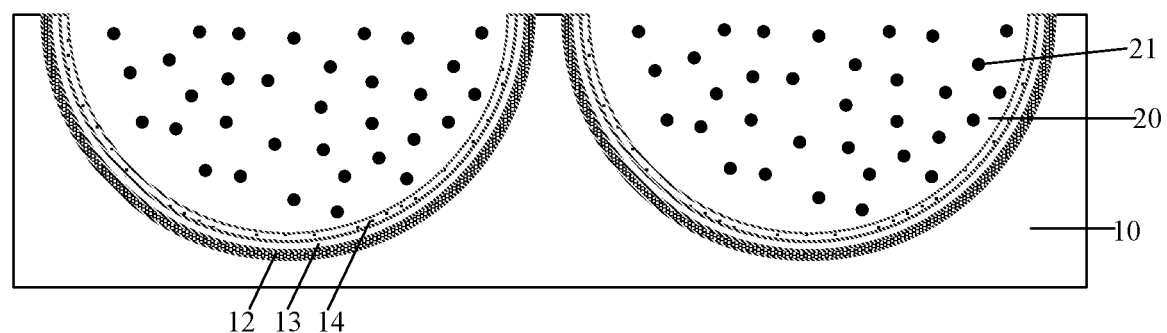
FIG. 7c is a schematic diagram of a structure after electronic ink is filled in the first groove on the basis of FIG. 7b.
Figure 7D:
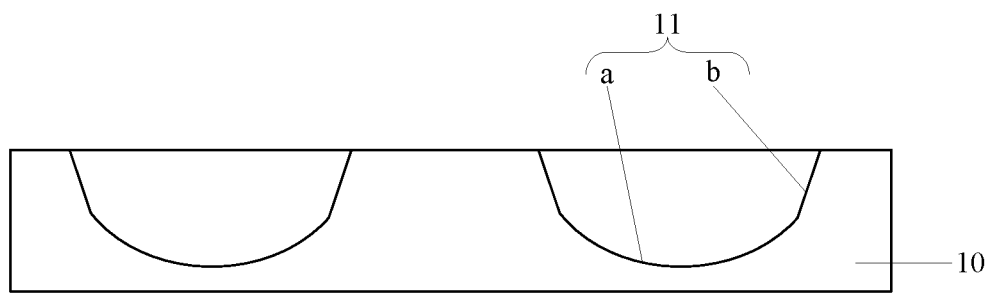
FIG. 7d is a schematic diagram of a structure by forming a first groove on a substrate according to some embodiments of the present disclosure.

In S12, as shown in FIG. 7c, electronic ink 20 is filled within each of the plurality of first grooves 11. The electronic ink 20 includes black charged particles 21.

For example, the electronic ink is formed by scattering charged particles, each of which is covered by black pigment, in a liquid.

In S13, a plurality of point electrodes 31 shown in FIG. 2 are formed on a first encapsulation substrate 30.

In S14, as shown in FIG. 2, the electronic ink 20 in each of the plurality of first grooves 11 is encapsulated by the first encapsulation substrate 30.

The first grooves 11 are in one-to-one correspondence with the point electrodes 31. The electronic ink 20 is encapsulated by, for example, attaching the first encapsulation substrate 30 on a surface of the substrate 10 provided with the first grooves 11.

Exemplary, the first encapsulation substrate 30 is attached to the substrate 10 by an ultraviolet (UV) curing method, so that the point electrode 31 is disposed adjacent to the electronic ink 20.

The point electrodes 31 are for example transparent electrodes. Alternatively, the point electrodes 31 are opaque electrodes. In order to prevent affecting the emitted light, in some embodiments, the point electrodes 31 are the transparent electrodes, and the material of each of the point electrodes 31 is for example indium tin oxide (ITO), indium oxide zinc (IZO), or graphene, etc.

It is known to those skilled in the art that in order to supply power to the point electrodes 31, the method further includes forming first power supply lines on the first encapsulation substrate 30. The first power supply lines are electrically connected with the point electrodes 31 respectively. Different point electrodes 31 are independently supplied with power through the first power supply lines, that is, the point electrodes 31 are insulated from each other.

Each of the point electrodes 31 is on the order of microns, and the specific size of each of the point electrodes 31 can be determined according to the size of a corresponding first groove 11. In addition, the shape of each of the point electrodes 31 is not limited in the present disclosure, and the point electrode 31 is for example in a shape, such as a rectangle shape, that is easy to be manufactured in a process.

Each of the point electrodes 31 can be provided in a region, where the reflected light is less, according to the specific shape of a corresponding one of the first grooves 11.

In a case where a first groove 11 is a hemispherical groove, the point electrode 31 is disposed at a center of sphere of the hemispherical groove.

Of course, in order to supply power to metal layers of the F-R cavities, the method further includes forming second power supply lines on the first encapsulation substrate 30. The power is supplied, via the second power supply line, only to the first metal electrode layer 14 of the F-R cavity, or to both of the first metal electrode layer 14 and the second metal layer 12 of the F-R cavity. In this case, the second metal layer 12 is for example a second metal electrode layer 12.

In the method for manufacturing the display panel provided by the embodiments of the present disclosure, by forming a F-R cavity including a first metal electrode layer 14, a dielectric layer 13 and a second metal layer 12 within each of the first grooves 11, and by disposing the point electrode 31 corresponding to each of the first grooves on the first encapsulation substrate 30, the on-state display and the off-state display may be realized by controlling the voltages applied to the first metal electrode layer 14 and the point electrode 31 within a corresponding first groove 11. In addition, by controlling the thickness of the dielectric layer 13 of the F-R cavity, the demand for the band of the light reflected off each F-R cavity may be satisfied when in the on-state.

Based on the above description, the display panel has a plurality of pixel regions, and each pixel region includes at least three sub-pixels. Each sub-pixel region has a first groove 11 therein, and the thicknesses of the dielectric layers 13 of different sub-pixel regions in a same pixel region are different.

A color display may be realized in the pixel region by controlling the thicknesses of the dielectric layers 13 in different sub-pixel regions of the pixel region, so that the display panel has a color display function.

In some embodiments, as shown in FIG. 4, each pixel region includes a first sub-pixel region 41, a second sub-pixel region 42 and a third sub-pixel region 43. A thickness of a dielectric layer 13 in the first sub-pixel region 41 is a first thickness D1, and the dielectric layer 13 having the first thickness D1 is configured to filter out light other than red light. A thickness of a dielectric layer 13 in the second sub-pixel region 42 is a second thickness D2, and the dielectric layer 13 having the second thickness D2 is configured to filter out light other than green light. A thickness of a dielectric layer 13 in the third sub-pixel region 43 is a third thickness D3, and the dielectric layer 13 having the third thickness D3 is configured to filter out light other than blue light.

In some embodiments, the first thickness D1 is less than the third thickness D3, and the third thickness D3 is less than the second thickness D2. Exemplary, the first thickness is about 48 nm, the second thickness is about 93 nm, and the third thickness is about 83 nm.

Based on this, a gray scale of monochromatic light emitted from each of the sub-pixel regions can be controlled by controlling the voltage applied to a corresponding point electrode 31.

In order to make the colors displayed by the display panel look richer, and make the picture more exquisite, in some embodiments, as shown in FIG. 5, the F-R cavity in each of the sub-pixel regions includes two F-R sub-cavities 01 insulated from each other (F-R sub-cavity 01a and F-R sub-cavity 01b), and orthographic projections of the two F-R sub-cavities on the first encapsulation substrate 30 do not overlap. Similarly, as shown in FIG. 5, each of the two F-R sub-cavities 01 includes a first metal electrode sub-layer 14, a dielectric sub-layer 13 and a second metal sub-layer 12. In this case, the gray scale of the monochromatic light emitted from each of the sub-pixel regions may be improved by independently supplying power to a first metal electrode sub-layer 14 of each of the two F-R sub-cavities, or a first metal electrode sub-layer 14 and a second metal sub-layer 12 of each of the two F-R sub-cavities.

Figure 8A:
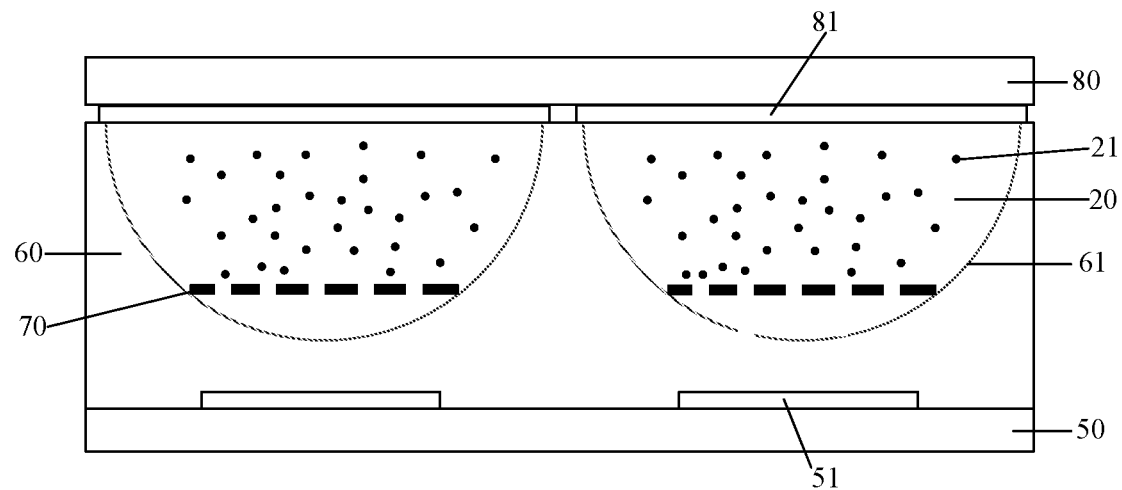
FIG. 8a is a first schematic diagram of another display panel according to some embodiments of the present disclosure.
Figure 8B:
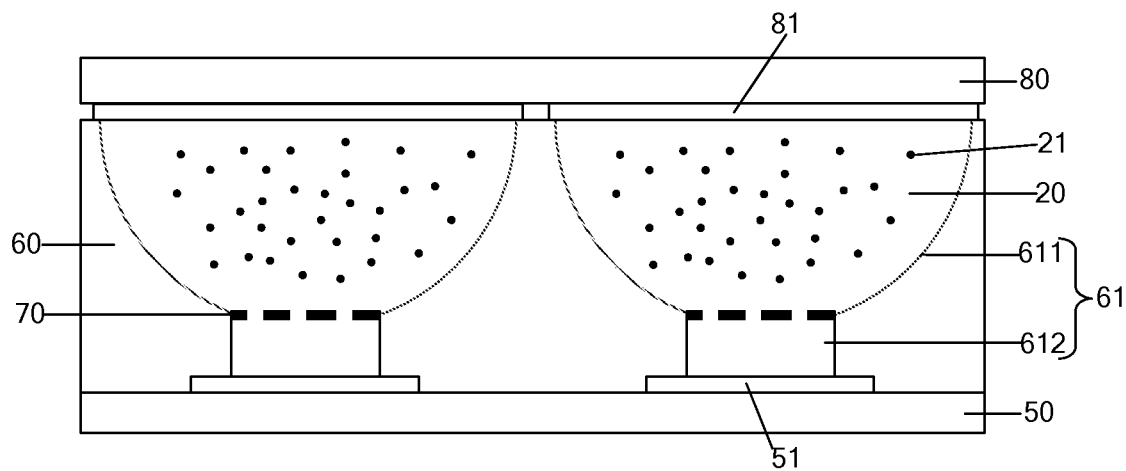
FIG. 8b is a second schematic diagram of another display panel according to some embodiments of the present disclosure.

Some embodiments of the present disclosure provide a display panel, and as shown in FIGS. 8a and 8b, the display panel includes a lower substrate 50, a plurality of third electrodes 51, a film layer 60, a plurality of second grooves 61 formed in a surface of the film layer 60, a perforated reflective layer 70 within each of the grooves 61, electronic ink 20 within each of the grooves 61, a plurality of transparent fourth electrodes 81 and a second encapsulation substrate 80. The plurality of third electrodes 51 are disposed on the lower substrate 50. The film layer are disposed on the lower substrate 51, and the plurality of second grooves 61 are provided in a surface of the film layer 60 facing away from the lower substrate 50. The second grooves 61 are in one-to-one correspondence with the third electrodes 51. In some embodiments, each of the second grooves 61 includes a hemispherical groove portion.

The perforated reflective layer 70 is fixed within a corresponding second groove 61 and is close to a bottom of the second groove 61. There is a space between the perforated reflective layer 70 and the second groove 61.

The electronic ink 20 is filled in each of the second grooves 61. The electronic ink 20 includes black charged particles 21. A refractive index of liquid in the electronic ink 20 is larger than a refractive index of the film layer 60 having the plurality of second grooves 61, so that for most of light entering the electronic ink 20, a total reflection may occur at an interface of the electronic ink 20 and the film layer 60. In addition, a diameter of each of the charged particles 21 is less than a diameter of each of via holes in the perforated reflective layer 70, so that the charged particles 21 can pass through the via holes of the perforated reflective layer 70.

The second encapsulation substrate 80 is disposed on a side of the film layer 60 provided with the plurality of second grooves 61. The transparent fourth electrodes 81 are disposed on the second encapsulation substrate 80, and the fourth electrodes 81 and the second grooves 61 are in one-to-one correspondence.

Figure 9A:
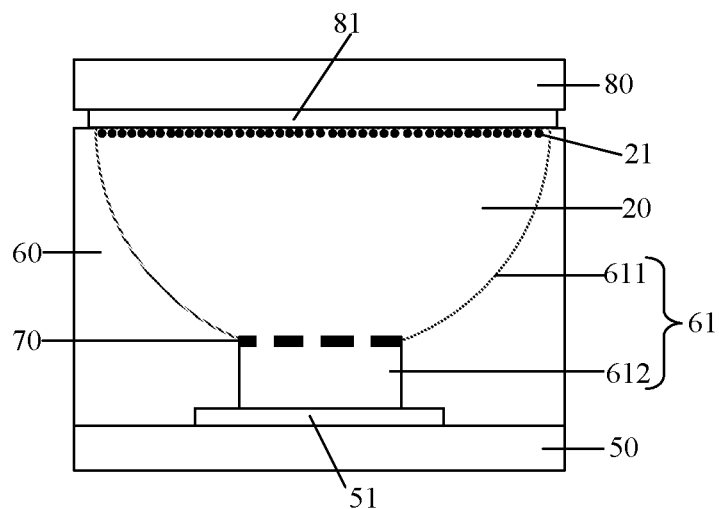
FIG. 9a is a schematic diagram showing a region of another display panel, where one of second grooves is located, in an off-state according to some embodiments of the present disclosure.

Based on the structure of the display panel, a reflection-type display may be realized. For example, as shown in FIG. 9a, for a region of the display panel where one of the second grooves 61 is located, when it is in an off-state, the black charged particles 21 are adsorbed on a surface of the second encapsulation substrate 80 close to the second groove 61 by applying a voltage to the fourth electrode 81, so that light from outside cannot enter the second groove 61, and light within the second groove 61 cannot pass through the particles, thereby forming a dark state in this region.

In order to reduce the light leakage in the dark state, in some embodiments, each of the fourth electrodes 81 completely covers an opening of a corresponding second groove 61. In addition, a concentration of the black charged particles 21 in the electronic ink 20 is improved, so that when a voltage is applied to the fourth electrode 81, the black charged particles 21 adsorbed on the side of the second encapsulation substrate 80 may completely cover the opening of the second groove 61.

Figure 9B:
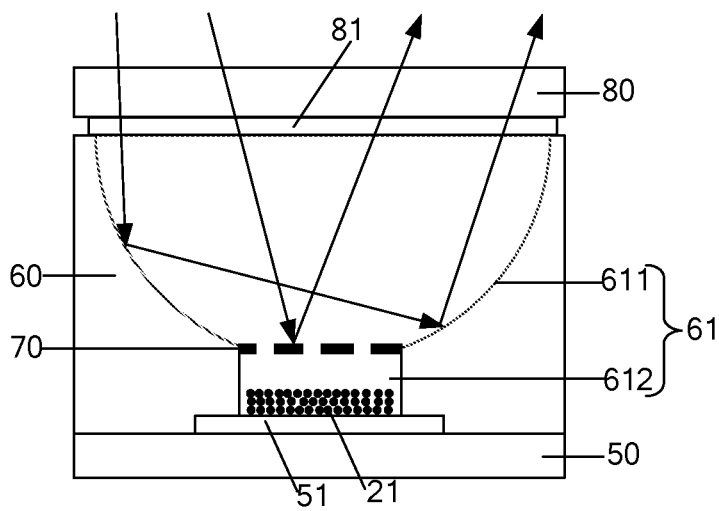
FIG. 9b is a schematic diagram showing a region of another display panel, where one of second grooves is located, in an on-state according to some embodiments of the present disclosure.

As shown in FIG. 9b, when it is in an on-state, by applying a voltage to one of the third electrodes 51, black charged particles 21 within a corresponding second groove 61 pass through via holes in a corresponding reflective layer 70, and enter the space between the reflective layer 70 and the second groove 61. In this case, for light incident on a side wall of the second groove 61, a total reflection may occur, and light incident on the reflective layer 70 may also be reflected. Then, the reflected light may be emitted from the second encapsulation substrate 80.

When the charged particles 21 are negatively charged, in the off-state and in the on-state, positive voltages can be applied to the fourth electrode 81 and the third electrode 51, respectively. Similarly, when the charged particles 21 are positively charged, in the off-state and in the on-state, negative voltages can be applied to the fourth electrode 81 and the third electrode 51, respectively.

With respect to the arrangement that the third electrode 51 is disposed adjacent to the film layer 60, if the third electrodes 51 are disposed on a surface of the lower substrate 50 facing away from the electronic ink 20, a larger voltage is needed to move the charged particles 21 to the second sub-groove 612 in the on-state. Therefore, the third electrodes 51 are disposed on a surface of the lower substrate 50 adjacent to the film layer 60.

Similarly, the fourth electrodes 81 are disposed on a surface of the second encapsulation substrate 80 close to the electronic ink 20.

The electronic ink is formed by for example scattering charged particles, each of which is covered by black pigment, in a liquid. In addition, since each of the second grooves 61 has an opening, after the electronic ink 20 is filled within the second groove 61, the electronic ink 20 can be encapsulated within the second groove 61 by disposing the second encapsulation substrate 80 on an opening side of the second grooves 61 of the film layer 60. That is, the second encapsulation substrate 80 is disposed on a side of the film layer 60 provided with the second grooves 61.

In addition, it is known to those skilled in the art that in order to supply power to the fourth electrode 81, the display panel further includes fourth power supply lines disposed on the second encapsulation substrate 80, and the fourth power supply lines are electrically connected with the fourth electrodes 81 respectively. Different fourth electrodes 81 are independently supplied with power through the fourth power supply lines, that is, the fourth electrodes 81 are insulated from each other.

Similarly, In order to supply power to the third electrode 51, the display panel further includes third power supply lines disposed on the lower substrate 50, and the third power supply lines are electrically connected with the third electrodes 51 respectively. Different third electrodes 51 are independently supplied with power through the third power supply lines, that is, the third electrodes 51 are insulated from each other.

In the display panel provided by the embodiments of the present disclosure, by disposing a perforated reflective layer 70 close to a bottom of each of the second grooves 61, the on-state display and the off-state display may be realized by controlling the voltage applied to a third electrode 51 and a fourth electrode 81 within each of the second grooves 61. In the on-state, due to the arrangement of the perforated reflective layer 70, the reflectivity of light in a center region of the second groove 61 may be improved, and the brightness of the center region is increased. In addition, the via holes in the perforated reflective layer 70 may increase the potential energy barrier when the electronic ink moves up and down, thereby improving the stability in the bistable state of on-state and the off-state, and reducing the power consumption.

In some embodiments, as shown in FIG. 8b, each of the second grooves 61 includes a first sub-groove 611 and a second sub-groove 612. The first sub-groove 611 is a hemispherical groove, and has a bottom opening at its bottom. The second sub-groove 612 is located at the bottom opening of the first sub-groove 611, and the bottom opening of the first sub-groove 611 is communicated with a top opening of the second sub-groove 612 located at its top. The reflective layer 70 is fixed at the bottom opening of the first sub-groove 611.

For example, taking a region of the display panel where one of the second grooves 61 is located as an example, as shown in FIG. 9a, when in an off-state, the black charged particles 21 are adsorbed on a side of the second encapsulation substrate 80 close to the second groove 61 by applying a voltage to the fourth electrode 81, thereby achieving a dark state in this region.

When in the on-state, as shown in FIG. 9b, by applying a voltage to the third electrode 51, the black charged particles 21 pass through the via holes in the reflective layer 70, and enter the second sub-groove 612, so that for light incident on the surface of the first sub-groove 611, a total reflection may occur, and light incident on the reflective layer 70 may also be reflected. Then, the reflected light is emitted from the second encapsulation substrate 80.

By setting a structure of the second groove 61 as a structure that includes the first sub-groove 611 and the second sub-groove 612, in which the first sub-groove 611 is a hemispherical groove, and has a bottom opening at its bottom, the second sub-groove 612 is located at the bottom opening of the first sub-groove 611, and the bottom opening of the first sub-groove 611 is communicated with a top opening of the second sub-groove 612 located at its top, an exitance of the light incident on the surface of the first sub-groove 611 is improved in the on-state.

Figure 10A:
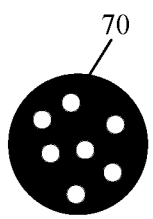
FIG. 10a is a top view of a reflective layer in another display panel according to some embodiments of the present disclosure.

A shape of one of the perforated reflective layers 70 is as shown in FIG. 10a, for example. In addition, as shown in FIG. 10b, the perforated reflective layer 70 includes a perforated polymer film layer 701 and a perforated metal reflective layer 702. Via holes in the perforated metal reflective layer 702 are in one-to-one correspondence with via holes in the perforated polymer film layer 701, and they completely overlap each other. In some embodiments, the metal reflective layer 702 is located close to the second encapsulation substrate 80, and the light is directly reflected off the metal reflective layer 702 without passing through the polymer film layer 701, thereby reducing light loss. In some other embodiments, the polymer film layer 701 has a higher transmittance, and the polymer film layer 701 is located close to the second encapsulation substrate 80. Since the via holes are not easy to be formed in the reflective film layer, while via holes are easy to be formed in the polymer film layer, in some embodiments, the perforated polymer film layer 701 is prepared first, and then a metal material is sputtered or deposited on the polymer film layer 701 to form a metal reflective layer 702 having the same shape as the polymer film layer.

A material of the polymer film layer 701 is for example a polymer material such as polycarbonate (PC), poly methyl methacrylatemethacrylic acid (PMMA), etc. In some examples, a thickness of the polymer film layer 701 ranges from several tens to several hundreds of micrometers. For example, a material of the metal reflective layer 702 includes at least one of Al, Ti, gold, or Ag, etc. Since the reflectivity of Al is high, and the cost is low, the material of the metal reflective layer is for example Al.

The thickness of the metal reflective layer 702 ranges from about 100 nm to about 1500 nm. When the thickness of the metal reflective layer 702 is less than 100 nm, a part of light passes through the metal reflective layer 702, thereby causing light loss. In addition, when the thickness of the metal reflective layer 702 is larger than 1500 nm, the thickness of the entire perforated reflective layer 70 is too thick, thereby reducing the volume of the second groove 61 for receiving the electronic ink 20.

Based on this, in order to ensure that the light is completely reflected and avoid the transmission of light, in some embodiments, the thickness of the first metal layer 702 is 100 nm, 150 nm, 300 nm, 500 nm, 700 nm, 1000 nm, or 1500 nm, etc.

Since the second grooves 61 are easily formed on a resin, a material of the film layer 60 includes for example the resin. Exemplary, the material of the film layer 60 includes at least one of PEMS, PET, or PI. For example, a material of the fourth electrode 81 includes at least one of ITO, IZO, or grapheme, etc.

For example, the third electrodes 51 are transparent electrodes. Alternatively, the third electrodes 51 are opaque electrodes. Based on this, in some examples, a material of the third electrode 51 and a material of the fourth electrode 81 are the same.

Some embodiments of the present disclosure provide a method for manufacturing a display panel, such as the display panel shown in FIG. 8b. As shown in FIGS. 8a and 8b, the method includes the following steps. Firstly, a film layer 60 having a plurality of second grooves 61 is formed on a lower substrate 50 on which a plurality of third electrodes 51 have been formed. The plurality of second grooves 61 is formed via a nanoimprint technology. Each of the second grooves 61 includes a hemispherical groove portion, and the second grooves 61 are in one-to-one correspondence with the third electrodes 51. Next, a perforated reflective layer 70 is fixed within each of the second grooves 61 at a position close to the bottom of the corresponding second groove 61, and there is a space between the perforated reflective layer 70 and the second groove 61. Next, electronic ink 20 is filled in each of the second grooves 61. The electronic ink 20 includes black charged particles 21. A refractive index of a liquid in the electronic ink 20 is larger than a refractive index of the film layer 60 having the plurality of second grooves 61, and a diameter of each of the charged particles 20 is less than a diameter of each of the via holes in the reflective layer 70. Next, a plurality of fourth electrodes 81 are formed on a second encapsulation substrate 80. Next, the electronic ink 20 in each of the second grooves 61 is encapsulated by the second encapsulation substrate 80. The fourth electrodes 81 are in one-to-one correspondence with the second grooves 61.

In the method for manufacturing the display panel provided by the embodiments of the present disclosure, by disposing each of the perforated reflective layers 70 close to a bottom of a corresponding second groove 61, the on-state display and the off-state display may be realized by controlling the voltage applied to the third metal electrode 51 and the fourth electrode 81 within the second groove 61. In the on-state, due to the arrangement of the perforated reflective layer 70, the reflectivity of light in a center region of the second groove 61 may be improved, and the brightness of the center region is increased. In addition, the via holes in the perforated reflective layer 70 may increase the potential energy barrier when the electronic ink moves up and down, thereby improving the stability of the bistable state of the on-state and the off-state, and reducing the power consumption.

In some embodiments, as shown in FIG. 11, a method for manufacturing the display panel includes S20-S24.

Figure 12A:
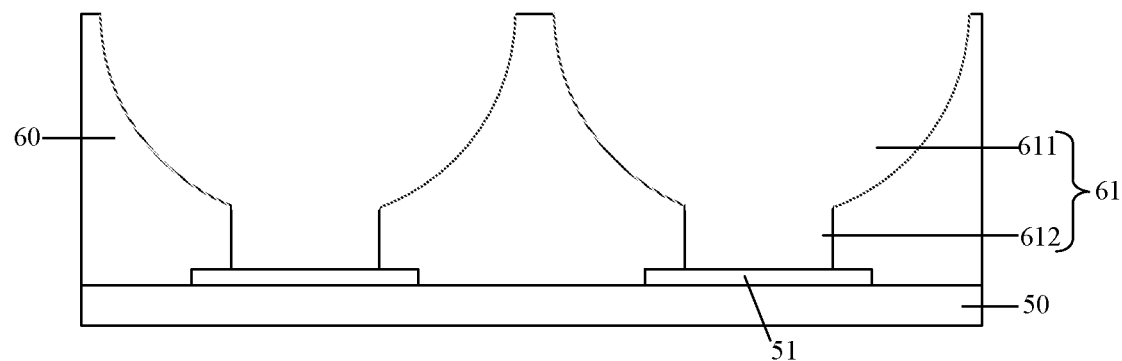
FIG. 12a is a schematic diagram of a structure obtained after a film layer having a plurality of second grooves is formed on a lower substrate according to some embodiments of the present disclosure.

In S20, as shown in FIG. 12a, a film layer 60 having a plurality of second grooves 61 is formed on a lower substrate 50 on which a plurality of third electrodes 51 have been formed. The second grooves 61 are formed via a nanoimprint technology. Each of the plurality of second grooves includes a first sub-groove 611 and a second sub-groove 612. The first sub-groove 611 is a hemispherical groove and has a bottom opening at its bottom. The second sub-groove 612 is located at the bottom opening of the first sub-groove 611, and the bottom opening of the first sub-groove 611 is communicated with a top opening of the second sub-groove 612 located at its top. The second grooves 61 are in one-to-one correspondence with the third electrodes 51.

In some examples, the first sub-grooves 611 and the second sub-grooves 612 are formed through one nanoimprint process. Alternatively, the first sub-grooves 611 and the second sub-grooves 612 are separately formed by two nanoimprint processes. In a case where the first sub-grooves 611 and the second sub-grooves 612 are formed by two nanoimprint processes, the aforementioned film layer 60 includes two sub-film layers, the first sub-groove 611 is formed in a sub-film layer, and the second sub-groove 612 is formed on another sub-film layer.

A material of the film layer 60 includes for example a resin. Exemplary, the material of the substrate 10 includes at least one of PEMS, PET, or PI. In some embodiments, the third electrodes 51 are disposed on a surface of the lower substrate 50 close to the film layer 60.

In order to supply power to the third electrodes 51, the method further includes forming third power supply lines, each of which is electrically connected with a corresponding third electrode 51, on the lower substrate 50. Different third electrodes 51 are independently supplied with power through the third power supply lines, that is, the third electrodes 51 are insulated from each other.

Figure 12B:
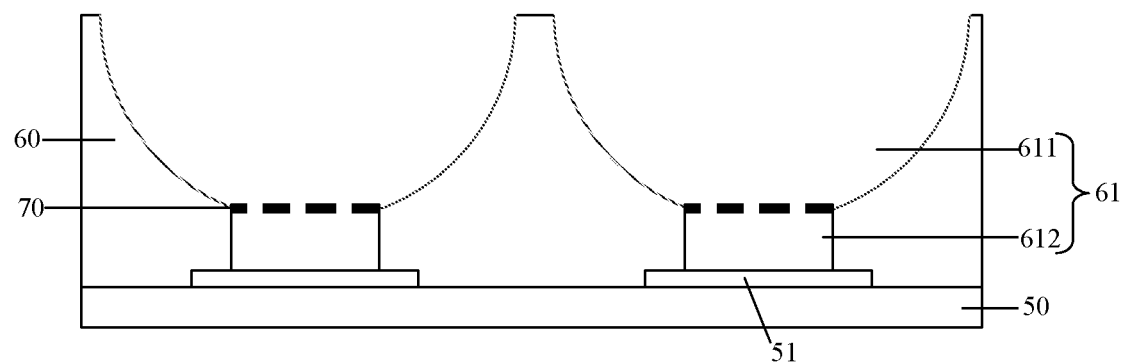

In S21, as shown in FIG. 12b, a perforated reflective layer 70 is fixed at a bottom opening of a corresponding first sub-groove 611.

Each of the perforated reflective layers 70 includes a perforated polymer film layer 701 and a perforated metal reflective layer 702. Via holes in the perforated metal reflective layer 702 are in one-to-one correspondence with via holes in the perforated polymer film layer 701, and they completely overlap each other.

A material of the polymer film layer 701 is for example a polymer material such as PC, PMMA, etc. In some examples, a thickness of the polymer film layer 701 ranges from several tens to several hundreds of micrometers. In some examples, a material of the metal reflective layer 702 includes at least one of Al, Ti, gold, or Ag, etc.

The thickness of the metal reflective layer 702 ranges from 100 nm to 1500 nm to ensure that the light is totally reflected to avoid the transmission of light.

For example, the second sub-groove 612 is formed first by a nanoimprint process, and the prepared perforated reflective layer 70 is attached to a top opening of the second sub-groove 612. Then the first sub-groove 611 is formed by a nanoimprint process. For example, during the process of manufacturing the perforated reflective layer 70, the perforated polymer film layer 701 is prepared first, and then a metal material is sputtered or deposited on the polymer film layer 701 to form a metal reflective layer 702 having the same shape as the polymer film layer.

In some other examples, the first sub-groove 611 is formed first by a nanoimprint process, and the prepared perforated reflective layer 70 is attached to the bottom opening of the first sub-groove 611. Then, the second sub-groove 612 is formed by a nanoimprint process, and a top opening of the second sub-groove 612 is communicated with the bottom opening of the first sub-groove 611. For example, during the process of manufacturing the perforated reflective layer 70, the perforated polymer film layer 701 is prepared first, and then a metal material is sputtered or deposited on the polymer film layer 701 to form a metal reflective layer 702 having the same shape as the polymer film layer.

In some other examples, the second sub-groove 612 is formed first, and the perforated polymer film layer 70 is formed on the top opening of the second sub-groove 612. Then a metal material is sputtered or deposited on the polymer film layer 701 to form a metal reflective layer 702 having the same shape as the polymer film layer 701. Then the first sub-groove 611 is formed, and the top opening of the second sub-groove 612 is communicated with the bottom opening of the first sub-groove 611.

It will be noted that, in the above circumstance, the film layer 60 includes two sub-film layers, the first sub-groove 611 is formed in a sub-film layer, and the second sub-groove 612 is formed in another sub-film layer. The two sub-film layers are bonded together to form the film layer 60.

Alternatively, the second groove 61 is formed first by a nanoimprint process, and the prepared perforated reflective layer 70 is attached to the bottom opening of the first sub-groove 611.

It will be noted that, as shown in FIGS. 12a and 12b, the second grooves 61 are formed first, and then each of the prepared perforated reflective layers 70 is fixed at a bottom opening of a corresponding first sub-groove 611, but the embodiments of the present disclosure is not limited thereto.

Figure 12C:
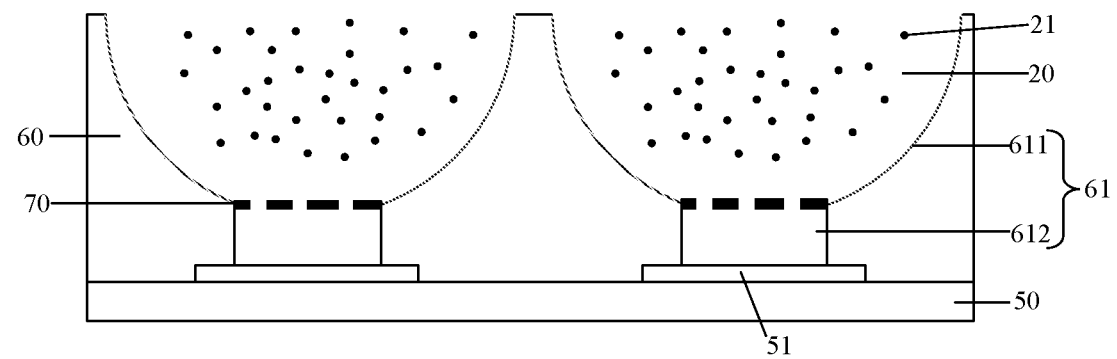
FIG. 12c is a schematic diagram of a structure obtained after electronic ink is filled in the second grooves on the basis of FIG. 12b.

In S22, as shown in FIG. 12c, electronic ink 20 is filled in each of the second grooves 61. The electronic ink 20 includes black charged particles 21. A refractive index of liquid in the electronic ink 20 is larger than a refractive index of the film layer 60 having the plurality of second grooves 61, and a diameter of each of the charged particles 20 is less than a diameter of each of via holes in the reflective layer 70.

In S23, a plurality of fourth electrodes 81 are formed on a second encapsulation substrate 80.

In S24, as shown in FIG. 8a, the electronic ink 20 in each of the plurality of second grooves 61 is encapsulated by the second encapsulation substrate 80. The fourth electrodes 81 are in one-to-one correspondence with the second grooves 61.

In some embodiments, the fourth electrodes 81 are disposed adjacent to the electronic ink 20.

In order to supply power to the fourth electrode 81, the method further including forming fourth power supply lines on the second encapsulation substrate 80. The fourth power supply lines are electrically connected with the fourth electrodes 81 respectively. Different fourth electrodes 81 are independently supplied with power through the fourth power supply line, that is, the fourth electrodes 81 are insulated from each other.

In addition, in order to realize a complete dark state, the fourth electrodes 81 should completely cover the openings of the second grooves 61, respectively.

In the method for manufacturing the display panel according to the embodiments of the present disclosure, Since the structure of the second groove is set as a structure includes the first sub-groove 611 and the second sub-groove 612, in which the first sub-groove 611 is a hemispherical groove and has a bottom opening, the second sub-groove 612 is located at the bottom opening of the first sub-groove 611, and the bottom opening of the first sub-groove 611 is communicated with a top opening of the second sub-groove 612, and the perforated reflective layer 70 is fixed at the bottom opening of the first sub-groove 611, a exitance of the light incident on the two sides of the first sub-groove 611 is improved in the on-state.

The above description is merely the embodiments of the present disclosure, but the scope of the present disclosure is not limited thereto, and changes or substitutions within the technical scope of the disclosure that can be easily though by those person skilled in the art should be considered to be within protection scope of the present disclosure. Therefore, the protection scope of the present disclosure should be subject to the protection scope of the claims.

Additional embodiments including any one of the embodiments described above may be provided by the disclosure, where one or more of its components, functionalities or structures is interchanged with, replaced by or augmented by one or more of the components, functionalities or structures of a different embodiment described above.

What is claimed is:

1. A display panel comprising:
    a substrate;
    a plurality of first grooves formed in a surface of the substrate;
    a second metal layer, a dielectric layer and a first metal electrode layer disposed in sequence within each of the plurality of first grooves, wherein the first metal electrode layer is semi-transmissive, the dielectric layer is light-transmissive, and the second metal layer is non-transmissive;
    electronic ink filled within each of the plurality of first grooves, the electronic ink comprising black charged particles;
    a first encapsulation substrate disposed on the surface of the substrate provided with the plurality of first grooves; and
    a plurality of point electrodes disposed on the first encapsulation substrate, wherein the plurality of first grooves are in one-to-one correspondence with the plurality of point electrodes, each of the plurality of point electrodes is on the order of microns, and an area of each of the plurality of point electrodes is smaller than an opening area of a corresponding one of the plurality of first grooves so that a light reflected off the second metal layer is rarely or never blocked by the plurality of point electrodes.

2. The display panel according to claim 1, wherein, the plurality of first grooves are arcuate first grooves.

3. The display panel according to claim 2, wherein, the first metal electrode layer, the dielectric layer and the second metal layer form a Fabry-Perot cavity, and the Fabry-Perot cavity is configured to filter incident light.

4. The display panel according to claim 3, wherein, the second metal layer is a second metal electrode layer.

5. The display panel according to claim 3, wherein, the display panel has a plurality of pixel regions, and each pixel region comprises at least three sub-pixel regions;
    each sub-pixel region has a corresponding first groove therein, and thicknesses of dielectric layers in different sub-pixel regions of each of the plurality of pixel regions are different.

6. The display panel according to claim 5, wherein, each of the plurality of pixel regions comprises a first sub-pixel region, a second sub-pixel region and a third sub-pixel region;
- a thickness of a dielectric layer in the first sub-pixel region is a first thickness, and the dielectric layer having the first thickness is configured to filter out light other than red light;
- a thickness of a dielectric layer in the second sub-pixel region is a second thickness, and the dielectric layer having the second thickness is configured to filter out light other than green light; and
- a thickness of a dielectric layer in the third sub-pixel region is a third thickness, and the dielectric layer having the third thickness is configured to filter out light other than blue light.

7. The display panel according to claim 6, wherein, the first thickness is less than the third thickness, and the third thickness is less than the second thickness.

8. The display panel according to claim 5, wherein, a Fabry-Perot cavity in each sub-pixel region includes two Fabry-Perot sub-cavities that are insulated from each other therein, and there is no overlap between orthographic projections of the two Fabry-Perot sub-cavities on the first encapsulation substrate.

9. The display panel according to claim 3, wherein, the plurality of first grooves are hemispherical grooves.

10. The display panel according to claim 9, wherein, each of the plurality of point electrodes is located at a center of sphere of a corresponding first groove.

11. The display panel according to claim 3, wherein, a thickness of the first metal electrode layer ranges from 15 nm to 50 nm, and a thickness of the second metal layer ranges from 100 nm to 1500 nm.

12. The display panel according to claim 3, wherein, a material of the substrate comprises a resin.

13. A method for manufacturing the display panel according to claim 1, the method comprising:
- forming the plurality of first grooves in a surface of the substrate via a nanoimprint process;
- forming the second metal layer, the dielectric layer and the first metal electrode layer in sequence within each of the plurality of first grooves, wherein the first metal electrode layer, the dielectric layer and the second metal layer form a Fabry-Perot cavity;
- filling the electronic ink in each of the plurality of first grooves;
- forming the plurality of point electrodes on the first encapsulation substrate; and
- encapsulating the electronic ink in each of the plurality of first grooves by the first encapsulation substrate.

14. A method for controlling the display panel according to claim 3, the method comprising:
- applying a voltage to the first metal electrode layer so that the charged particles are adsorbed onto a surface of the first metal electrode layer when a region, where a corresponding first groove is located, is in an off-state; and
- applying a voltage to a point electrode to concentrate the charged particles toward the point electrode when a region, where a corresponding first groove is located, is in an on-state.

* * * * *